United States Patent
Jenness et al.

(10) Patent No.: US 9,316,312 B2
(45) Date of Patent: Apr. 19, 2016

(54) PISTON RING FOR AN INTERNAL COMBUSTION ENGINE

(71) Applicant: Federal-Mogul Corporation, Southfield, MI (US)

(72) Inventors: Blair Matthew Jenness, Grosse Pointe Park, MI (US); Matthew Ryan Pedigo, Howell, MI (US); Troy Kantola, Whitmore Lake, MI (US)

(73) Assignee: Federal-Mogul Corporation, Southfield, MI (US)

( * ) Notice: Subject to any disclaimer, the term of this patent is extended or adjusted under 35 U.S.C. 154(b) by 520 days.

(21) Appl. No.: 13/768,355

(22) Filed: Feb. 15, 2013

(65) Prior Publication Data

US 2013/0213220 A1 Aug. 22, 2013

Related U.S. Application Data

(60) Provisional application No. 61/600,350, filed on Feb. 17, 2012.

(51) Int. Cl.

| F16J 9/06 | (2006.01) |
|---|---|
| F02F 1/18 | (2006.01) |
| F02F 1/20 | (2006.01) |
| F02F 1/00 | (2006.01) |

(52) U.S. Cl.
CPC ... *F16J 9/06* (2013.01); *F02F 1/18* (2013.01); *F02F 1/20* (2013.01); *F16J 9/062* (2013.01); *F02F 2001/006* (2013.01)

(58) Field of Classification Search
CPC ..................................... F16J 9/06; F16J 9/206
See application file for complete search history.

(56) References Cited

U.S. PATENT DOCUMENTS

| 580,090 | A | 4/1897 | Lewis |
| 945,233 | A | 1/1910 | Hatch |
| 1,015,502 | A | 1/1912 | Meaker |
| 1,218,132 | A | 3/1917 | Tuhey |
| 1,436,130 | A | 11/1922 | Webb |

(Continued)

FOREIGN PATENT DOCUMENTS

| CN | 101191556 A | 6/2008 |
| CN | 201513553 U | 6/2010 |

(Continued)

OTHER PUBLICATIONS

International Search Report, mailed Jun. 20, 2013 (PCT/US2013/026318).

*Primary Examiner* — F. Daniel Lopez

(74) *Attorney, Agent, or Firm* — Robert L. Stearns; Dickinson Wright, PLLC

(57) ABSTRACT

A piston ring for sealing a cylinder wall to a piston body is provided. The piston ring includes a ring body that extends about an axis and has inner and outer faces. The inner face presents a pair of ridges that extend in a radially inward direction, and the outer face presents a groove. A spring of an elastomeric material substantially circumferentially surrounds the ring body and is seated in the groove on the inner face. The spring biases the ring body in the radially inward direction to seal the ridges against the piston body. The ring body also has at least one oil drainage port which extends at an angle relative to the radially inward direction from the inner face to a location on the outer face on one axial side of the spring for conveying oil out of a space between the ridges.

11 Claims, 5 Drawing Sheets

(56) References Cited

U.S. PATENT DOCUMENTS

| | | | |
|---|---|---|---|
| 1,682,130 A | 1/1926 | Johnston | |
| 1,871,820 A | 8/1932 | Morton | |
| 1,959,769 A | 5/1934 | Simmen | |
| 2,426,613 A | 8/1945 | Jackson | |
| 2,514,016 A | 7/1950 | Casado | |
| 3,548,721 A | 12/1970 | Eisennegger | |
| 3,777,722 A | 12/1973 | Lenger | |
| 4,161,321 A | 7/1979 | Hendrixon et al. | |
| 4,247,972 A * | 2/1981 | Hendrixon et al. | 29/888.07 |
| 4,681,327 A * | 7/1987 | d'Agostino et al. | 277/587 |
| 5,788,246 A | 8/1998 | Kuribayashi et al. | |
| 6,116,204 A | 9/2000 | Katsaounis | |
| 7,735,834 B2 | 6/2010 | Hofbauer | |
| 2008/0122185 A1 | 5/2008 | Katou | |
| 2010/0326391 A1 | 12/2010 | Mierisch et al. | |

FOREIGN PATENT DOCUMENTS

| | | |
|---|---|---|
| EP | 0985861 A2 | 3/2000 |
| FR | 2030083 A1 | 10/1970 |
| GB | 345313 A | 3/1931 |
| JP | H09159028 A | 6/1997 |
| WO | 03044400 A1 | 5/2003 |

* cited by examiner

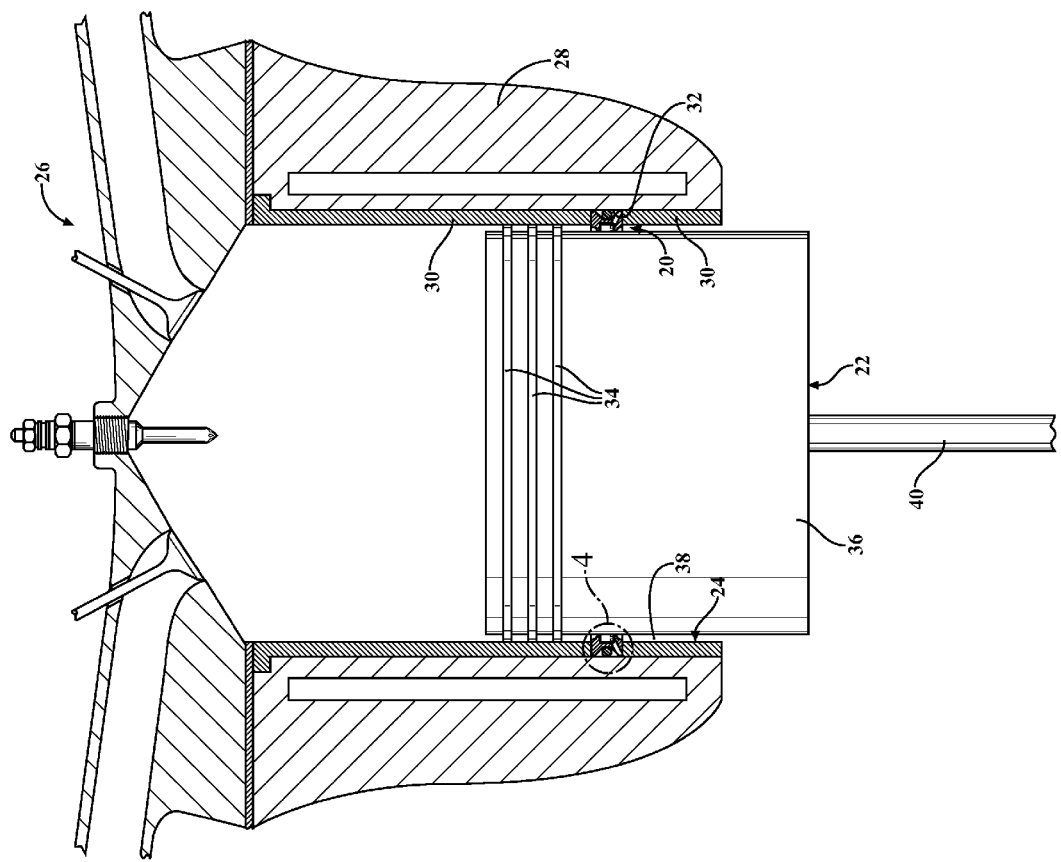

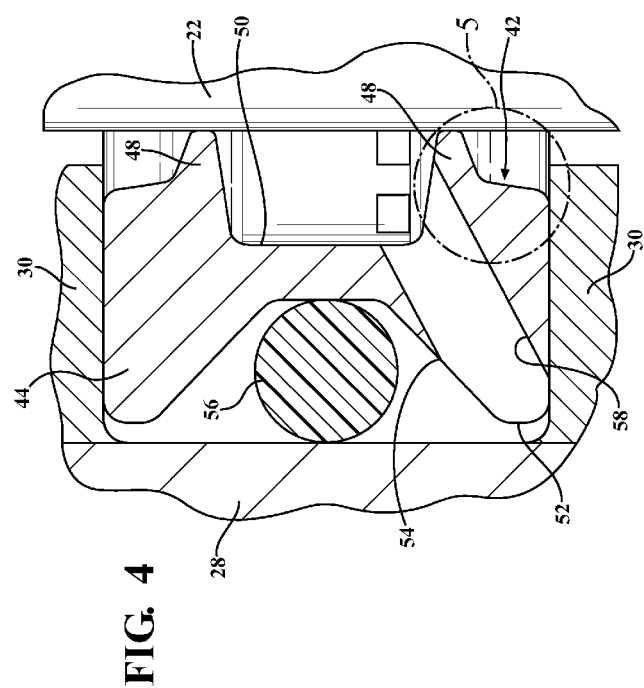
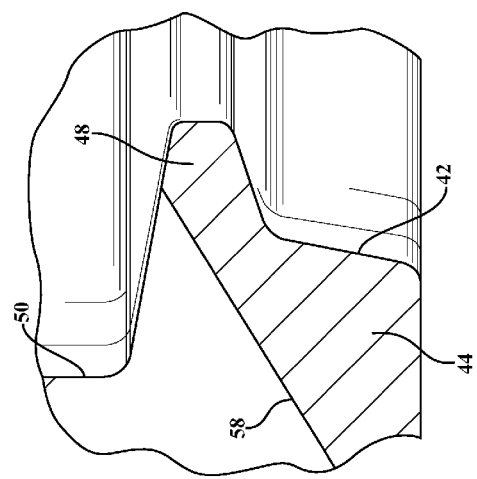

PISTON RING FOR AN INTERNAL COMBUSTION ENGINE

CROSS REFERENCE TO RELATED APPLICATION

This application claims the benefit of application Ser. No. 61/600,350 filed Feb. 17, 2012.

BACKGROUND OF THE INVENTION

1. Field of the Invention

The present invention relates generally to internal combustion engines having at least one reciprocating piston within a cylinder, and more particularly to seals between the reciprocating piston and a cylinder wall.

2. Related Art

Typical internal combustion engines are provided with at least one piston body which reciprocates within a cylinder of an engine block. In general, each piston body includes a plurality of ring grooves, each of which receives and operably supports a piston ring. In operation, the piston rings remain in the ring grooves and travel with their respective piston bodies in a reciprocating motion within cylinders of an engine block. Among other things, the pistons rings function to seal combustion gasses in a combustion chamber above the piston body, to transfer heat from the piston body to the cylinder wall, to restrict the passage of oil from the crank case to the combustion chamber and to provide a generally uniform oil film on the cylinder wall. Such piston rings are typically biased with a spring force in a radially outward direction against the cylinder wall to establish the seal between the piston body and the cylinder wall.

SUMMARY OF THE INVENTION

One aspect of the present invention provides for a piston ring for sealing a cylinder wall to a piston body. The piston ring includes a ring body that extends about an axis and has an inner face and an outer face. The inner face presents at least two ridges that extend in a radially inward direction. The ridges on the inner face are spaced from one another, and the outer face presents a groove. A spring of an elastomeric material substantially circumferentially surrounds the ring body and is seated in the groove on the inner face. The spring biases the ring body in the radially inward direction to seal the ridges on the inner face against the piston body. The ring body also has at least one oil drainage port which extends at an angle relative to the radially inward direction from the inner face to a location on the outer face on one axial side of the spring for conveying oil out of a space between the ridges.

The piston ring may be seated in a channel of a cylinder wall and sealed against the skirt of the piston body. As such, the piston ring remains generally stationary and does not move relative to the cylinder wall during operation of the engine. This location allows for increased stability of the piston body as it reciprocates in the cylinder of the engine without compromising the length of the skirt, i.e. the skirt may extend downwardly past the cylinder wall when the piston body is in a bottom dead center position. The piston ring is also resistant to blow by. Because the oil drainage ports extend at an angle relative to the radially inward direction, they do not interfere with the inner-most surfaces of the ridges and thus do not compromise the oil and gas seal between the cylinder wall and the piston body provided by the piston ring. Additionally, the oil drainage ports do not compromise the structural integrity of the ring body.

Another aspect of the present invention provides for a power cylinder assembly. The power cylinder assembly includes a cylinder wall with a substantially circumferentially channel formed therein. The power cylinder assembly also includes a piston body with a skirt, and at least a portion of an outer surface of the skirt extends substantially continuously around a circumference. The power cylinder assembly further includes a piston ring which is seated in the channel of the cylinder wall and has a ring body that extends about an axis. The ring body has an inner face with at least two ridges that extend in a radially inward direction and are spaced from one another in an axial direction. The ring body also has an outer surface that faces opposite of the inner surface and presents a groove. The piston ring further includes a spring of an elastomeric material substantially circumferentially surrounds the ring body and is seated in the groove on the outer face. The spring biases the ring body in the radially inward direction to seal the ridges against the circumferentially continuous portion of the skirt of the piston body. The ring body has at least one oil drainage port which extends at an angle relative to the radially inward direction from the inner face to the outer face on one axial side of the spring for conveying oil out of a space between the ridges.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 3 is another sectional view of the exemplary embodiment of the power cylinder assembly with the piston ring of FIG. 1 and showing the piston body in a bottom dead center position;

FIG. 4 is a cross-sectional and fragmentary view showing the piston ring of FIG. 1 disposed within a channel of a cylinder wall and in sealing engagement with a piston body;

FIG. 5 is a cross-sectional and enlarged view showing a portion of the piston ring of FIG. 1;

DESCRIPTION OF THE ENABLING EMBODIMENT

Figure 1:
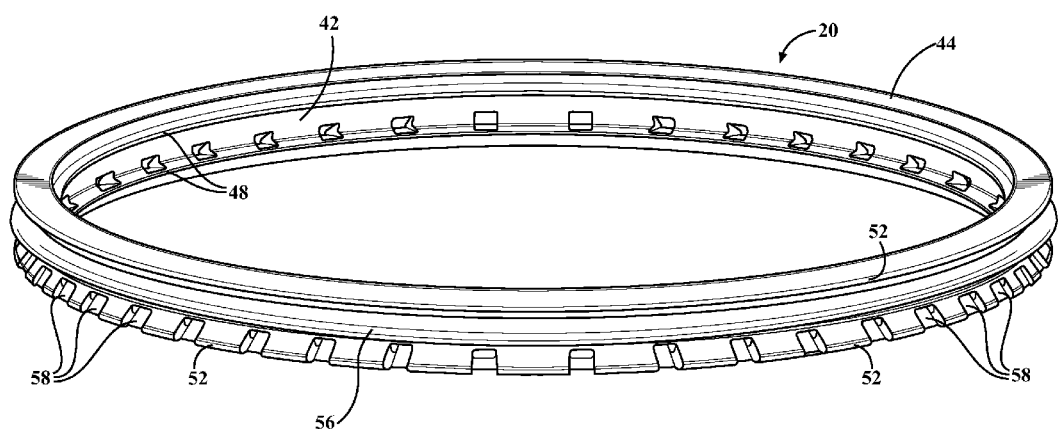
FIG. 1 is a perspective and elevation view of an exemplary embodiment of a piston ring.

Referring to the Figures, wherein like numerals indicate corresponding parts throughout the several views, an exemplary embodiment of a piston ring 20 for sealing a piston body 22 to a cylinder wall 24 of a power cylinder assembly 26 of an internal combustion engine is generally shown in FIG. 1. Referring now to the cross-sectional views of FIGS. 2 and 3, the exemplary piston ring 20 is shown as installed in a power cylinder assembly 26 of an internal combustion engine having an engine block 28 and a two-piece cylinder liner 30 which together present an axially extending cylinder wall 24 having a channel 32 that extends substantially circumferentially around the cylinder wall 24. Specifically, in the exemplary embodiment, the piston ring 20 is disposed between ends of the cylinder liner 30 pieces which are spaced axially from one another to present the aforementioned channel 32. However, it should be appreciated that the channel 32 could be formed into the cylinder wall 24 through a range of different manners. For example, the channel 32 could be formed directly into the engine block 28 without any cylinder liner 30. The exemplary piston ring 20 is shown installed in a diesel fueled compression ignition engine; however, it should be appreciated that the piston ring 20 could alternately be used in a range of different types of internal combustion engines including, for example, spark ignition engines or horizontally opposed two piston per cylinder engines.

Figure 2:
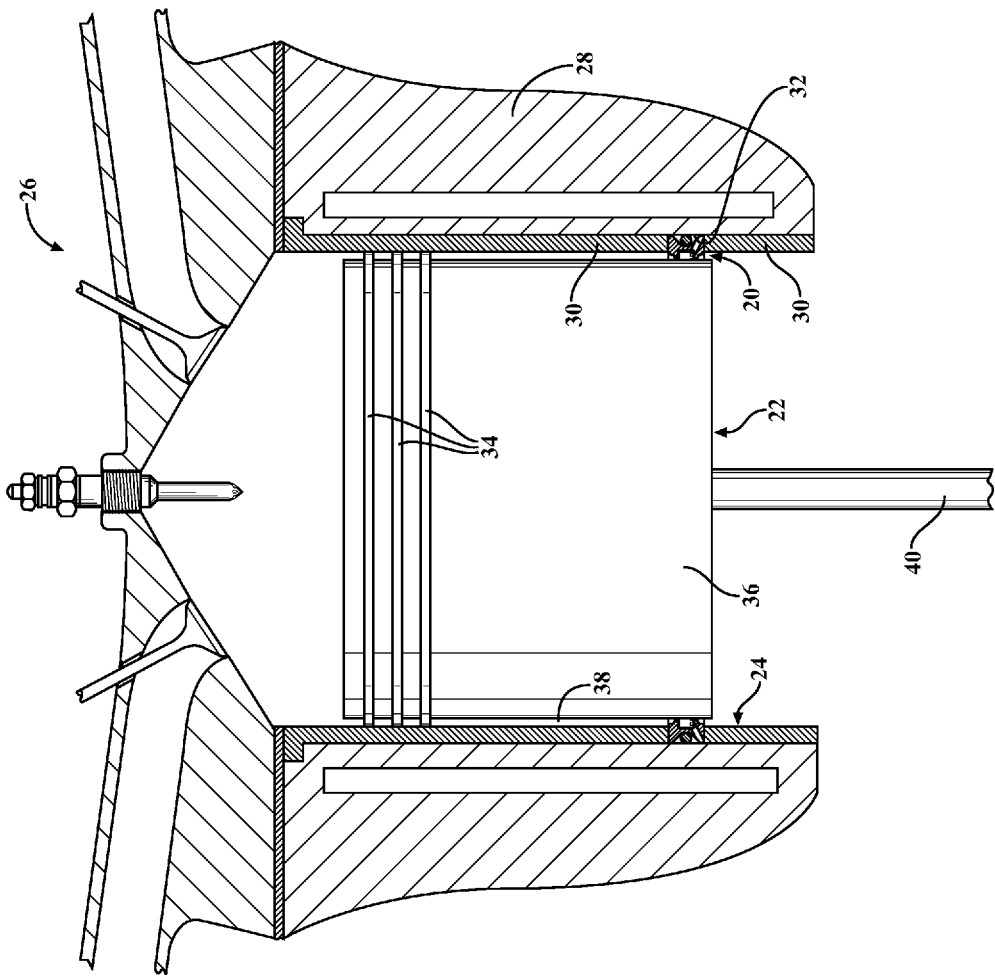
FIG. 2 is a sectional view of an exemplary embodiment of a power cylinder assembly and including the piston ring of FIG. 1 and showing a piston body in a top dead center position.

Referring still to FIGS. 2 and 3, the piston body 22 of the exemplary power cylinder assembly 26 includes one or more upper piston rings 34 (a plurality being illustrated in the exemplary embodiment) which are carried in associated ring grooves formed in the outer wall of the piston body 22. The piston body 22 also has a skirt 36 which depends from the piston ring 20 region and helps guide the piston body 22 during reciprocation within the cylinder during operation of the engine. At least a portion of the skirt 36 is generally cylindrically-shaped and has an outer surface which extends continuously around a circumference. This portion of the skirt 36 is sized to be close to but relatively smaller than the inner diameter of the cylinder wall 24 such that there is an operating gap 38 therebetween. The piston body 22 is coupled by a wrist pin (not shown) or a similar type of connection device to a connecting rod 40, which in turn is coupled to a crank shaft (not shown) or a similar mechanism.

Referring still to FIGS. 2 and 3, in its location in the channel 32 of the cylinder wall 24, the exemplary piston ring 20 is mounted stationarily relative to the engine block 28 and is sealed against the outer surface of the skirt 36 of the piston body 22 to establish a gas and fluid tight seal between the cylinder wall 24 and the piston body 22. The piston ring 20 has an inner face 42 (best shown in FIG. 4) that is in running contact with the skirt 36 of the piston body 22 during operation of the engine to seal combustion gasses in the combustion chamber on one side of the piston body 22 and to seal oil on the other side of the piston body 22, e.g. in a crank case (not shown) or any other oil chamber. During operation of the engine, the piston body 22 moves up and down within the cylinder wall 24 between a top dead center position shown in FIG. 2 and a bottom dead center position shown in FIG. 3. As shown, the exemplary piston ring 20 remains in sealing engagement with the circumferentially continuous portion of the skirt 36 to maintain the gas and oil tight seal throughout the piston body's 22 range of travel. The location of the piston ring 20 in the channel 32 of the cylinder wall 24 allows for increased stability of the piston body 22 as it reciprocates in the cylinder of the engine without compromising the length of the skirt 36, i.e. the skirt 36 may extend downwardly into the crank case (not shown) when the piston body 22 is in the bottom dead center position.

Referring back to FIG. 1, the exemplary piston ring 20 includes a ring body 44 that extends about an axis and has ends which are separated from one another by a ring gap 46. Referring now to FIG. 4, the ring body 44 has an inner face 42 with a pair of ridges 48 which are spaced axially from one another and extend in a radially inward direction. As shown, when installed in a power cylinder assembly 26, these ridges 48 directly and slidably engage the circumferentially continuous portion of the outer surface of the piston body 22 to establish the gas and oil tight seal between the cylinder wall 24 and the piston body 22. Between the ridges 48, the inner face 42 of the exemplary ring body 44 includes a generally flat valley region 50. In the exemplary embodiment, the top and bottom surfaces of the ridges 48 are angled relative to the radial direction. These surfaces may be disposed at similar or different angles relative to the radial direction. For example, in the exemplary embodiment, the surfaces of the ridges 48 nearest the valley region 50 are disposed at approximately a ten degree angle relative to the radial direction, and the surfaces of the ridges 48 (opposite of the valley region 50) furthest from the valley region 50 are disposed at an angle of approximately twenty degrees relative to the radial direction. In the exemplary embodiment, the portions of the inner face 42 above and below the ridges 48 are also disposed at an angle relative to the radial direction by approximately eighty degrees. It should be appreciated that these surfaces could be disposed at any suitable angles relative to the radial or axial direction and could have any suitable dimensions. Additionally, in the exemplary embodiment, the intersections of the various surfaces of the inner face 42 are rounded or radiused. However, it should be appreciated that these intersections could alternately be sharp, i.e. non-rounded.

Referring still to FIG. 4, the side of the ring body 44 opposite of the inner face 42 is an outer face 52 which presents a generally V-shaped groove 54. The piston ring 20 includes a spring 56 of an elastomeric material which is seated in the groove 54 and substantially circumferentially surrounds the ring body 44. Specifically, the spring 56 is an O-ring of a synthetic rubber, a natural rubber or a thermoplastic material. The O-ring spring 56 exerts a biasing force against the ring body 44 to bias the ridges 48 of the inner face 42 against the outer surface of the piston body 22 and establish the aforementioned gas and oil tight seal between the cylinder wall 24 and the piston body 22 when installed in the groove 54 of the ring body 44.

Figure 6:
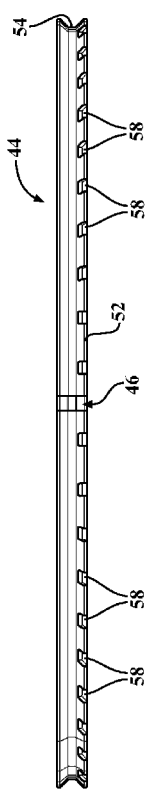
FIG. 6 is a front elevation view of a ring body of the piston ring of FIGS. 1.
Figure 7:
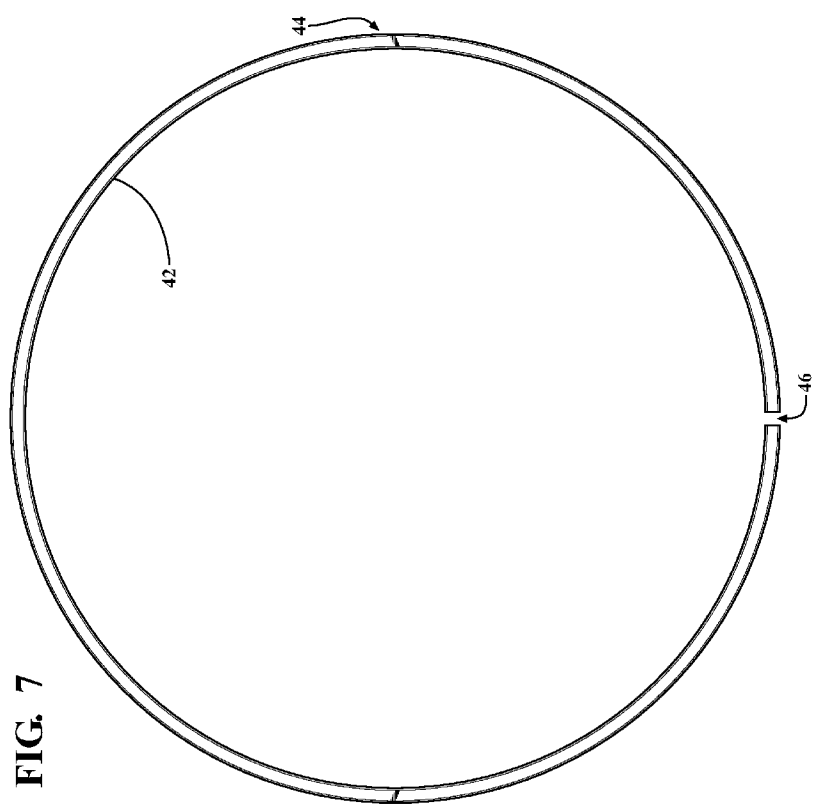
FIG. 7 is a top elevation view of the ring body of the piston ring of FIG. 1.

Referring now to FIG. 6, the ring body 44 of the exemplary piston ring 20 includes a plurality of oil drainage ports 58 which are generally uniformly spaced from one another in a circumferential direction along the length of the ring body 44. However, it should be appreciated that the spacing between the oil drainage ports 58 may be varied. Referring back to FIG. 4, the oil drainage ports 58 extend at an angle relative to the radially inward direction from the inner face 42 to the outer face 52 on one axial side of the spring 56 for conveying oil out of the space between the ridges 48. Because the oil drainage ports 58 extend at an angle relative to the radially inward direction, they do not interfere with the inner-most surfaces of the ridges 48 and thus do not compromise the oil and gas seal between the cylinder wall 24 and the piston body 22 provided by the piston ring 20. Additionally, the oil drainage ports 58 do not compromise the structural integrity of the ring body 44. In the exemplary embodiment, each of the oil drainage ports 58 extends from at least a portion of one of the ridges 48 on the inner face 42 to at least a portion of the groove 54 on the outer face 52. The oil that is conveyed from the space between the ridges 48 to the other side of the ring body 44 may then drain back to the crank case or the oil chamber below the piston body 22 during upward strokes of the piston body 22.

The ring body 44 may be formed through any desirable manufacturing process and may be of any desirable material including, for example, cast iron or steel. The ring body 44 may also either be uncoated or may have a wear resistant coating (such as chromium, chromium with aluminum oxide ceramic [CKS], chromium with microdiamond [GDC], etc.) applied to at least its inner face 42.

The exemplary description of the embodiment is meant to be illustrative and not limiting of the invention. Variations and modifications to the disclosed embodiment may become apparent to those skilled in the art and come within the scope of the invention.

What is claimed is:

1. A piston ring for sealing a cylinder wall to a piston body, comprising:
    a ring body extending about an axis and having an inner face and an outer face, said inner face presenting least two ridges that extend in a radially inward direction with said ridges being spaced axially from one another by a valley region, and said outer face presenting a groove;
    a spring of an elastomeric material substantially circumferentially surrounding said ring body and seated in said groove on said outer face, said spring biasing said ring body in said radially inward direction for sealing said ridges on said inner face against the piston body;
    said ring body having at least one oil drainage port extending at an angle relative to said radially inward direction from said inner face to a location on said outer face on one axial side of said spring for conveying oil out of a space between said ridges; and
    wherein said at least one oil drainage port extends from a portion of one of said ridges on said inner face to a portion of said groove on said outer face.

2. The piston ring as set forth in claim 1 wherein said at least one oil drainage port is further defined as a plurality of oil drainage ports.

3. The piston ring as set forth in claim 2 wherein said plurality of oil drainage ports are spaced circumferentially from one another.

4. The piston ring as set forth in claim 1 wherein said at least two radially inwardly extending ridges on said inner face of said ring body is further defined as only two radially inwardly extending ridges.

5. The piston ring as set forth in claim 1 wherein said ring body has a gap.

6. The piston ring as set forth in claim 1 wherein said ring body is uncoated.

7. The piston ring as set forth in claim 1 wherein said ring body is of cast iron or steel.

8. A power cylinder assembly, comprising:
    a cylinder wall having a channel formed therein, said channel extending substantially circumferentially around said cylinder wall;
    a piston body having a skirt and wherein at least a portion of an outer surface of said skirt extends substantially continuously around a circumference;
    a piston ring disposed in said channel of said cylinder wall;
    said piston ring having a ring body that extends about an axis and has an inner face and an outer face, said inner face having at least two ridges that extend in a radially inward direction, said ridges being spaced axially from one another by a valley region, and said outer face presenting a groove;
    said piston ring further including a spring of an elastomeric material substantially circumferentially surrounding said ring body and seated in said groove on said outer face, said spring biasing said ring body in said radially inward direction to seal said ridges against said circumferentially continuous portion of said skirt of said piston body;
    said ring body having at least one oil drainage port extending at an angle relative to said radially inward direction from said inner face to a location on said outer face on one axial side of said spring for conveying oil out of a space between said ridges; and
    wherein said at least one oil drainage port extends from at least a portion of one of said ridges on said inner face to said groove on said outer face.

9. The power cylinder assembly as set forth in claim 8 wherein said at least one oil drainage port is further defined as a plurality of oil drainage ports.

10. The power cylinder assembly as set forth in claim 8 wherein said at least two radially inwardly extending ridges on said inner face of said ring body is further defined as only two radially inwardly extending ridges.

11. The power cylinder assembly as set forth in claim 8 wherein said ring body has a gap.

* * * * *